(12) United States Patent
Larkins

(10) Patent No.: US 11,937,552 B2
(45) Date of Patent: Mar. 26, 2024

(54) VEGETATION HANGER

(71) Applicant: DriFlower, LLC, Ashland, OR (US)

(72) Inventor: Todd Chandler Larkins, Ashland, OR (US)

(73) Assignee: DRIFLOWER, LLC, Ashland, OR (US)

( * ) Notice: Subject to any disclaimer, the term of this patent is extended or adjusted under 35 U.S.C. 154(b) by 424 days.

(21) Appl. No.: 17/066,633

(22) Filed: Oct. 9, 2020

(65) Prior Publication Data
US 2021/0105949 A1 Apr. 15, 2021

Related U.S. Application Data

(60) Provisional application No. 62/913,058, filed on Oct. 9, 2019.

(51) Int. Cl.
*A01F 25/12* (2006.01)
*F26B 7/00* (2006.01)

(52) U.S. Cl.
CPC ............ *A01F 25/12* (2013.01); *F26B 7/00* (2013.01)

(58) Field of Classification Search
CPC .. A01F 25/12; A47G 7/04; A47G 7/02; A47G 7/045; A47G 7/047; A47G 25/34; A47G 25/0692; A47G 7/044; A47G 7/042; A47G 25/0685; A47G 25/30; A47G 25/48; A22C 15/007
USPC ............... 211/41.3, 105.1, 123, 85.2, 85.3; 56/400.21, 400.01
See application file for complete search history.

(56) References Cited

U.S. PATENT DOCUMENTS

| | | | | |
|---|---|---|---|---|
| 281,524 A | * | 7/1883 | Knowlton | A01D 7/00 56/400.01 |
| 285,159 A | * | 9/1883 | Reynolds | A01F 25/12 211/113 |
| 531,496 A | * | 12/1894 | Barwick | B42D 5/005 402/33 |
| 941,448 A | | 11/1909 | Haglund | |
| 945,729 A | | 1/1910 | Rangnow | |
| 1,089,810 A | * | 3/1914 | Bain et al. | A01F 25/12 211/125 |
| 1,259,623 A | * | 3/1918 | Herrick | A47F 5/02 211/70.6 |

(Continued)

FOREIGN PATENT DOCUMENTS

| | | |
|---|---|---|
| CA | 2458956 A1 | 9/2004 |
| CN | 105474854 A | 4/2016 |

(Continued)

OTHER PUBLICATIONS

International Preliminary Report on Patentability and Written Opinion dated Apr. 12, 2022, issued in corresponding international application No. PCT/US2020/054898, 7 pages.

(Continued)

*Primary Examiner* — Jennifer E. Novosad
(74) *Attorney, Agent, or Firm* — Carter, DeLuca & Farrell, LLP; George Likourezos

(57) ABSTRACT

A vegetation hanger includes a linear plate and an aperture. The linear plate includes a first edge, a second edge, a first end portion, and a second end portion. The first edge includes at least one ridge disposed along the first edge. The aperture is disposed centrally along the linear plate and configured to slidably engage with a bar.

13 Claims, 1 Drawing Sheet

(56) References Cited

U.S. PATENT DOCUMENTS

| | | | | |
|---|---|---|---|---|
| 1,274,849 A | * | 8/1918 | Bullerdick | A01F 25/12 211/196 |
| 1,321,997 A | | 11/1919 | Duberstein | |
| 1,324,180 A | * | 12/1919 | Shupp | E05B 69/006 70/60 |
| 1,342,274 A | * | 6/1920 | Clark | E05B 69/00 296/77 |
| 1,383,025 A | * | 6/1921 | Vail | A47G 25/0692 248/300 |
| 1,512,052 A | * | 10/1924 | Richardson | A01F 25/12 454/177 |
| 1,515,078 A | | 11/1924 | Sheee | |
| 1,533,942 A | * | 4/1925 | Parrish | A24B 1/08 211/67 |
| 1,611,397 A | * | 12/1926 | Wells | A01F 25/12 211/113 |
| 1,638,651 A | * | 8/1927 | Bain | A01F 25/12 211/125 |
| 1,717,233 A | * | 6/1929 | Lefiell | A22C 15/007 211/113 |
| 1,727,269 A | * | 9/1929 | Bee | A47G 25/746 33/8 |
| 1,833,388 A | | 11/1931 | Carmack | |
| 1,868,638 A | | 7/1932 | Mackey | |
| 1,886,126 A | * | 11/1932 | Sessions | A47G 25/30 D6/319 |
| 1,922,989 A | * | 8/1933 | Terry | A47K 10/14 211/124 |
| 1,928,766 A | * | 10/1933 | Schmidt | A47B 61/02 211/99 |
| 2,010,303 A | * | 8/1935 | Hopley | A01G 20/30 172/380 |
| 2,037,971 A | * | 4/1936 | Ferren | E05B 73/00 70/61 |
| 2,045,848 A | * | 6/1936 | Geer | A47G 25/28 223/92 |
| 2,099,596 A | | 11/1937 | Bruening | |
| 2,119,217 A | * | 5/1938 | Pompeo | B25B 13/56 70/61 |
| 2,150,869 A | * | 3/1939 | Shafarman | A47G 25/743 D6/319 |
| 2,279,777 A | | 4/1942 | Dean | |
| 2,289,729 A | | 7/1942 | Robinson et al. | |
| 2,314,620 A | * | 3/1943 | Jander | A01D 7/10 56/400.01 |
| 2,317,916 A | * | 4/1943 | Kallal | A01D 7/06 56/400.01 |
| 2,338,290 A | * | 1/1944 | McDonald | A47B 31/00 211/41.1 |
| 2,411,856 A | | 12/1946 | Harding | |
| 2,422,922 A | * | 6/1947 | Nudelman | A47G 25/746 211/124 |
| 2,451,110 A | * | 10/1948 | Newman | A47B 61/02 211/115 |
| 2,462,431 A | * | 2/1949 | Schneider | C25D 17/08 204/297.06 |
| 2,469,208 A | * | 5/1949 | Rothrock | D06F 57/12 211/100 |
| 2,484,449 A | | 10/1949 | Fetterman | |
| 2,546,929 A | | 3/1951 | Nampa | |
| 2,580,193 A | | 12/1951 | Richterkessing | |
| 2,586,913 A | | 2/1952 | Burns | |
| 2,634,031 A | | 4/1953 | Klein | |
| 2,671,938 A | | 3/1954 | Roberts | |
| 2,692,711 A | * | 10/1954 | Norris | A47G 25/28 223/95 |
| 2,702,640 A | * | 2/1955 | Leonard | B44D 3/123 248/113 |
| 2,709,103 A | * | 5/1955 | Tillman | A24B 1/08 294/5.5 |
| 2,716,513 A | | 8/1955 | Braunstein | |
| 2,721,755 A | * | 10/1955 | Walner | A63B 47/02 473/286 |
| 2,828,897 A | | 4/1958 | Gordon | |
| 2,920,766 A | * | 1/1960 | Geryoldine | A47G 25/0692 211/123 |
| 2,929,514 A | * | 3/1960 | Stewart | A47B 61/02 248/317 |
| 2,981,418 A | * | 4/1961 | Bradley | D06F 57/122 211/119.009 |
| 3,029,952 A | * | 4/1962 | Bagdon | B65G 17/20 211/117 |
| 3,079,003 A | * | 2/1963 | Hilsinger, Jr. | A47J 47/16 248/311.2 |
| 3,129,820 A | * | 4/1964 | Stulman | A22C 15/007 211/117 |
| 3,131,817 A | | 5/1964 | Schenkler | |
| 3,158,265 A | * | 11/1964 | Thimons | A22C 15/007 248/243 |
| 3,194,458 A | | 7/1965 | Bennett | |
| 3,202,297 A | * | 8/1965 | Semonoff | A47F 5/04 211/163 |
| D202,954 S | | 11/1965 | Hanson | |
| 3,268,088 A | * | 8/1966 | Lawhorn | A47G 25/743 211/113 |
| 3,346,150 A | | 10/1967 | Clopton | |
| D210,333 S | | 2/1968 | Apy | |
| 3,535,808 A | | 10/1970 | Morrish | |
| 3,540,601 A | * | 11/1970 | Hutchison | A47G 25/0607 211/32 |
| 3,606,948 A | | 9/1971 | Strang | |
| 3,696,939 A | * | 10/1972 | Drowatzky | A22C 15/007 452/187 |
| 3,874,572 A | | 4/1975 | McClenning | |
| 3,900,181 A | * | 8/1975 | Pitanis | A47F 5/0006 248/340 |
| D236,572 S | | 9/1975 | Ostroll | |
| 4,141,453 A | * | 2/1979 | Hanan | A47F 5/02 211/85.2 |
| 4,264,013 A | * | 4/1981 | Vollmer | A47G 29/08 211/85.2 |
| D264,912 S | | 6/1982 | Bliss et al. | |
| 4,440,369 A | | 4/1984 | Banks | |
| D278,106 S | * | 3/1985 | Green | D6/315 |
| D280,049 S | * | 8/1985 | Benedict | D6/513 |
| 4,703,878 A | | 11/1987 | Louw | |
| 4,717,053 A | | 1/1988 | Wang | |
| 4,724,967 A | | 2/1988 | Valiulis | |
| 4,793,531 A | | 12/1988 | Blanchard et al. | |
| 4,813,552 A | * | 3/1989 | Walter | A47F 5/08 211/208 |
| 4,830,198 A | * | 5/1989 | Colquitt | B44D 3/123 211/13.1 |
| 4,845,602 A | | 7/1989 | Lehocki | |
| D304,793 S | * | 11/1989 | Burke | D6/569 |
| 4,881,342 A | | 11/1989 | Ferguson | |
| 5,007,562 A | | 4/1991 | Brink et al. | |
| 5,067,617 A | * | 11/1991 | Caldwell | A47F 7/02 211/85.2 |
| 5,074,445 A | | 12/1991 | Chen | |
| 5,097,910 A | * | 3/1992 | Traczek | A01B 1/12 172/381 |
| 5,129,524 A | * | 7/1992 | Holman | A47G 19/16 99/321 |
| D328,681 S | * | 8/1992 | Radosevich | D6/567 |
| 5,142,855 A | * | 9/1992 | Guidarelli | A01D 7/06 56/400.21 |
| 5,161,720 A | * | 11/1992 | Kolton | A47G 25/743 D6/327 |
| D331,425 S | * | 12/1992 | Rhyne | D6/315 |
| 5,170,916 A | * | 12/1992 | Kolton | A47G 25/30 223/92 |
| 5,172,814 A | * | 12/1992 | Pell | A47F 5/0807 211/85.2 |
| D332,180 S | | 1/1993 | Marshall et al. | |
| D338,575 S | * | 8/1993 | Takaya | D6/682.4 |
| 5,265,737 A | * | 11/1993 | Freeby | A47G 25/10 211/115 |

(56) References Cited

U.S. PATENT DOCUMENTS

| | | |
|---|---|---|
| 5,329,728 A | 7/1994 | Ray |
| 5,333,409 A | 8/1994 | Mendes |
| 5,337,986 A * | 8/1994 | Vollink ............... F16M 13/022 248/219.4 |
| 5,361,949 A | 11/1994 | Petrou |
| 5,388,354 A | 2/1995 | Marshall et al. |
| 5,396,994 A * | 3/1995 | Fitzgerald ............ A47F 5/0884 211/32 |
| D357,813 S | 5/1995 | Koresko |
| 5,440,869 A * | 8/1995 | Meehan .................. A01B 1/12 172/380 |
| 5,520,311 A | 5/1996 | Lam |
| 5,535,927 A * | 7/1996 | Garrison ............... A47G 25/30 223/92 |
| 5,544,765 A | 8/1996 | Farbman |
| 5,581,936 A | 12/1996 | Belgiorno |
| 5,647,492 A * | 7/1997 | Fillios ................. A47B 61/003 211/105.1 |
| 5,692,605 A * | 12/1997 | Lai ........................ A45C 11/16 217/60 E |
| 5,706,640 A * | 1/1998 | Tyrrell ................... A01D 7/00 56/400.01 |
| D393,299 S * | 4/1998 | Hunt ........................... D21/759 |
| 5,813,092 A | 9/1998 | Greenfield et al. |
| 5,819,961 A * | 10/1998 | Harris ................ A47G 25/0671 211/196 |
| 5,826,759 A | 10/1998 | Ohsugi |
| 5,884,422 A | 3/1999 | Marshall et al. |
| 6,047,867 A | 4/2000 | Heiber |
| 6,132,305 A | 10/2000 | Witherell |
| 6,164,466 A * | 12/2000 | Baradat .................. B62B 3/006 211/186 |
| 6,298,600 B1 | 10/2001 | Feldman |
| 6,340,238 B1 | 1/2002 | Pan |
| 6,349,863 B1 | 2/2002 | Frye |
| 6,375,018 B1 * | 4/2002 | Clement .................. A47F 7/02 211/85.2 |
| 6,389,744 B1 | 5/2002 | Pugh |
| 6,641,105 B1 | 11/2003 | Hamerski |
| 6,659,295 B1 | 12/2003 | De Land et al. |
| D494,779 S * | 8/2004 | Wenger ..................... D6/682.2 |
| 6,811,064 B2 | 11/2004 | Salem |
| 6,817,497 B2 | 11/2004 | Grasso et al. |
| D502,756 S * | 3/2005 | Birdwell ..................... D22/199 |
| 6,863,197 B1 | 3/2005 | Dirlam et al. |
| 7,015,815 B1 | 3/2006 | Feibelman |
| 7,097,051 B2 * | 8/2006 | Schober ............ A47G 25/0692 211/100 |
| 7,178,705 B1 | 2/2007 | Sutton |
| 7,237,685 B2 * | 7/2007 | Keegan ................. A47F 7/0028 211/60.1 |
| 7,377,409 B1 | 5/2008 | Brown |
| 7,681,887 B2 * | 3/2010 | Hensley ............... F41J 3/0014 273/380 |
| 7,774,977 B2 | 8/2010 | Miller Shelton |
| 7,984,585 B1 | 7/2011 | Wu |
| 8,276,714 B2 * | 10/2012 | Broyles .................. A63B 29/02 248/925 |
| D711,123 S | 8/2014 | Birge |
| 8,910,800 B1 * | 12/2014 | Bickford ................ A47G 25/10 211/32 |
| 9,113,736 B1 | 8/2015 | Antler |
| D772,584 S | 11/2016 | Debus |
| 9,782,031 B2 * | 10/2017 | Debus ................... A47G 25/32 |
| D806,410 S | 1/2018 | Denby et al. |
| 9,909,250 B1 * | 3/2018 | Greenspon ......... A47G 25/0685 |
| 10,092,116 B1 * | 10/2018 | Johns ..................... A47F 7/024 |
| D853,737 S | 7/2019 | Wolfe |
| D867,770 S | 11/2019 | Wright |
| D873,036 S * | 1/2020 | Cunningham ................. D6/327 |
| D919,341 S * | 5/2021 | Li ................................ D6/682.6 |
| 11,071,397 B1 * | 7/2021 | Sprunk ................... A47F 7/022 |
| D928,528 S * | 8/2021 | Liu ................................ D6/514 |
| D946,923 S * | 3/2022 | Larkins ........................ D6/513 |
| 11,259,654 B1 * | 3/2022 | Padula .................. A47F 5/0815 |
| 11,350,574 B2 * | 6/2022 | Larkins .................. A01F 25/12 |
| 2002/0073680 A1 * | 6/2002 | Barajas ..................... A01D 7/06 56/400.21 |
| 2002/0184799 A1 | 12/2002 | Chou |
| 2004/0226971 A1 | 11/2004 | Detten |
| 2005/0035159 A1 | 2/2005 | Hunt et al. |
| 2005/0139625 A1 | 6/2005 | Gouldson |
| 2005/0189383 A1 | 9/2005 | Weal et al. |
| 2006/0032130 A1 | 2/2006 | Liffers et al. |
| 2006/0226179 A1 | 10/2006 | Hsu |
| 2007/0266627 A1 | 11/2007 | Shelton |
| 2008/0236041 A1 | 10/2008 | Carpenter |
| 2008/0283558 A1 | 11/2008 | Rude et al. |
| 2011/0247185 A1 | 10/2011 | Bolden et al. |
| 2011/0284597 A1 | 11/2011 | Kaleta et al. |
| 2012/0132679 A1 | 5/2012 | Gouldson |
| 2013/0015215 A1 | 1/2013 | Coote |
| 2013/0221041 A1 | 8/2013 | Wittenstein et al. |
| 2014/0246464 A1 | 9/2014 | Zhong |
| 2014/0367425 A1 | 12/2014 | Laibe |
| 2015/0230400 A1 * | 8/2015 | Tia ........................... A01D 7/00 56/400.01 |
| 2016/0058210 A1 | 3/2016 | Strassburger et al. |
| 2016/0223137 A1 | 8/2016 | Ochipa |
| 2017/0105362 A1 | 4/2017 | Irving, Jr. |
| 2017/0238731 A1 | 8/2017 | Davies |
| 2017/0325614 A1 | 11/2017 | Baltz |
| 2018/0087293 A1 | 3/2018 | Strassburger et al. |
| 2018/0103785 A1 | 4/2018 | Goldman et al. |
| 2018/0160833 A1 | 6/2018 | Ho |
| 2018/0303263 A1 | 10/2018 | Jones et al. |
| 2018/0317685 A1 | 11/2018 | Boles |
| 2018/0325299 A1 | 11/2018 | Clark et al. |
| 2018/0356028 A1 * | 12/2018 | Fang ...................... F16M 13/02 |
| 2019/0014936 A1 | 1/2019 | Beyda et al. |
| 2019/0297781 A1 * | 10/2019 | Palmer ...................... F26B 9/10 |
| 2019/0307264 A1 | 10/2019 | Carr et al. |
| 2019/0380522 A1 | 12/2019 | Johansson |
| 2020/0085221 A1 | 3/2020 | Riedel et al. |
| 2020/0128988 A1 | 4/2020 | Moore et al. |
| 2020/0245796 A1 | 8/2020 | Gilbert |
| 2021/0094756 A1 * | 4/2021 | Larkins ................ B65D 88/129 |
| 2021/0105949 A1 * | 4/2021 | Larkins .................. A01F 25/12 |
| 2022/0110264 A1 * | 4/2022 | Larkins .................... A23B 7/02 |
| 2022/0295711 A1 * | 9/2022 | Larkins .................. A01F 25/12 |
| 2023/0240193 A1 * | 8/2023 | Larkins .................. A01F 25/12 211/113 |

FOREIGN PATENT DOCUMENTS

| | | |
|---|---|---|
| CN | 206611910 U | 11/2017 |
| CN | 107896731 A | 4/2018 |
| DE | 3246174 C2 | 1/1994 |
| FR | 2464638 A1 | 3/1981 |
| FR | 3062120 A1 | 7/2018 |
| JP | 2008092939 A | 4/2008 |
| JP | 4218802 B2 | 2/2009 |
| JP | 4399093 B2 | 1/2010 |
| JP | 2011010890 A | 1/2011 |
| KR | 20-2005-0002675 A | 1/2005 |
| KR | 2003821320000 Y1 | 4/2005 |
| KR | 2011 0029352 A | 3/2011 |
| KR | 101071670 B1 | 10/2011 |
| KR | 2012 0131010 A | 12/2012 |
| KR | 2017 0067056 A | 6/2017 |
| KR | 20170079314 A | 7/2017 |
| KR | 101938225 B1 | 1/2019 |
| WO | 2018150157 A1 | 8/2018 |
| WO | WO-2021072142 A1 * | 4/2021 ............ A01F 25/12 |

OTHER PUBLICATIONS

International Search Report and Written Opinion issued in corresponding International Application No. PCT/US2020/054898 dated Jan. 22, 2021, 14 pages.

(56) References Cited

OTHER PUBLICATIONS

International Search Report and Written Opinion issued in corresponding International Application No. PCT/US2020/053426 dated Jan. 18, 2021, 14 pages.

Chrystal Johnson: 11 How to dry herbs from your Garden, Happy Mothering natural living in a modern world Aug. 29, 2017 (Aug. 29, 2017), Retrieved from the Internet: URL:https://www.happy-mothering.com/diy-ha nging-herb-dryer/.

International Search Report and Written Opinion for Application No. PCT/US2020/042261 dated Nov. 2, 2020.

* cited by examiner

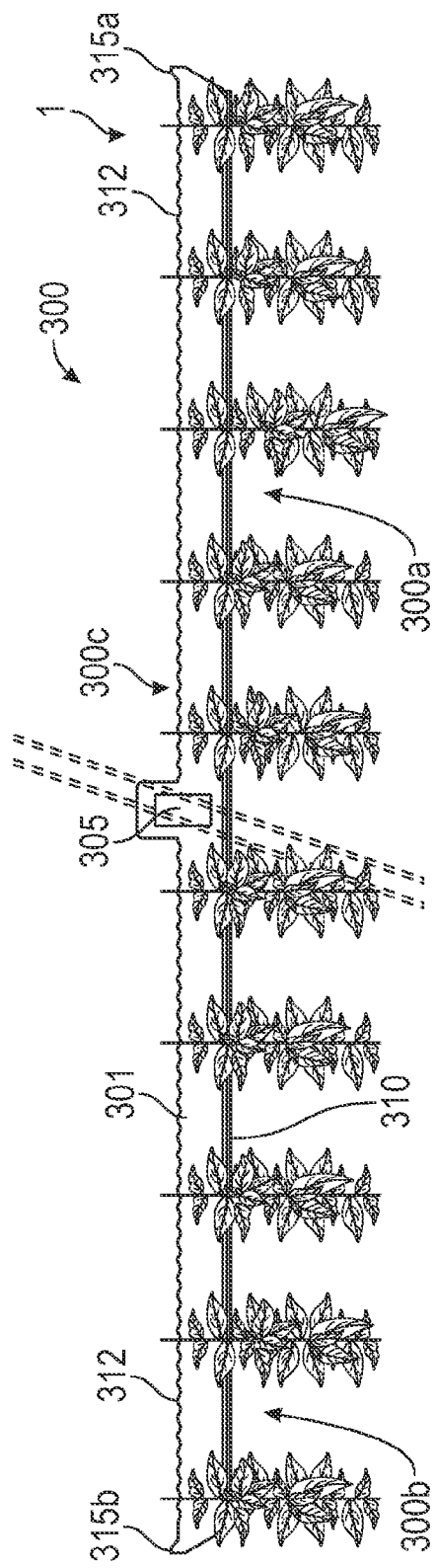
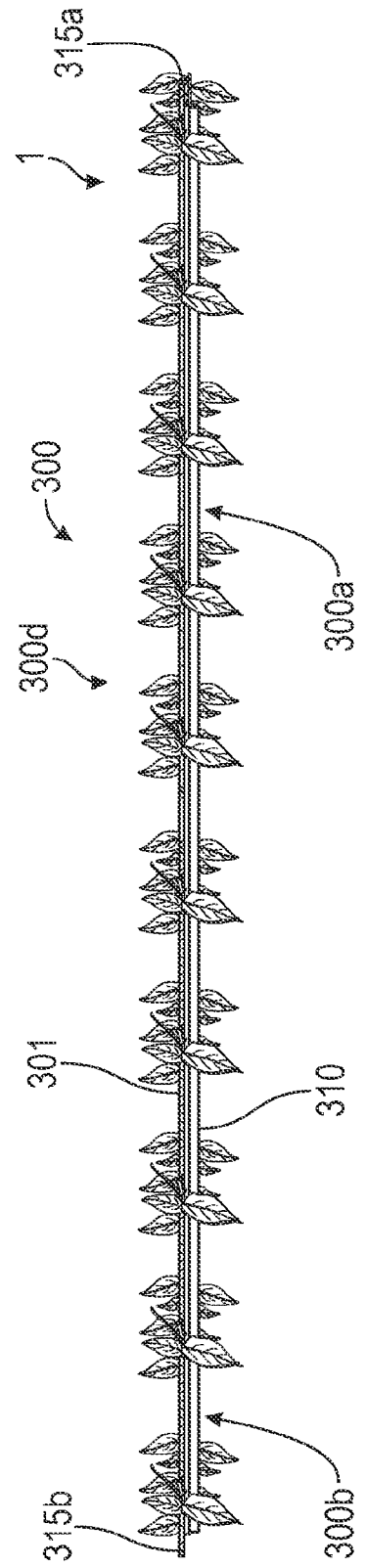
FIG. 1
FIG. 2

VEGETATION HANGER

CROSS-REFERENCE TO RELATED APPLICATIONS

This application claims the benefit of, and priority to, U.S. Provisional Patent Application No. 62/913,058, filed on Oct. 9, 2019, the entire contents of which are hereby incorporated herein by reference.

FIELD

The present disclosure generally relates to a hanger and more particularly, to a hanger for facilitating hang harvesting, transportation, drying and unloading of vegetation.

BACKGROUND

Vegetation, such as plants, herbs, flowers, hemp and/or cannabis, and other vegetation, are harvested, and then subsequently dried to produce a final product. Typically, during the drying process, vegetation is hung on plastic netting, which causes stress to the user and damages vegetation. This process requires the vegetation to be hung one branch at time and threaded through the netting to secure the vegetation. Removal of the vegetation also requires careful unthreading of the vegetation one branch at a time from the plastic netting. Other methods have been contemplated, such as clothing hangers, bailing wires, string and/or ropes, screens, chains, cages, fencing, and combinations thereof, all of which cause damage to vegetation and stress to the user. Therefore, there is a need to provide a method of facilitating hang harvesting, transporting, drying and unloading of without damaging the vegetation.

SUMMARY

The present disclosure relates to a hanger that includes a hanger portion and a crossbar coupled to the hanger portion to create a vegetation hanger to facilitate facilitating hang harvesting, transporting, drying and unloading of vegetation.

In one aspect, the present disclosure provides a vegetation hanger including a linear plate and an aperture. The linear plate has a first edge, a second edge, a first end portion, and a second end portion. The first edge includes at least one ridge disposed along the first edge. The aperture is disposed centrally along the linear plate and configured to slidably engage with a bar.

In aspects, the second edge of the linear plate may be bent at a predetermined angle relative to the crossbar.

In aspects, the predetermined angle may be 90 degrees.

In aspects, the first and second end portions of the linear plate each may include a lip.

In aspects, the linear plate may be tapered from a center point between the first and second end portions outwardly towards the first and second end portion.

In aspects, the vegetation hanger may be formed from one or more materials selected from metal, plastic, or composite materials.

In another aspect, the present disclosure provides a method of drying vegetation on a vegetation hanger. The method includes sliding a vegetation hanger includes onto a bar; hanging the vegetation on a first edge of a crossbar having at least one ridge disposed on the first edge; and carrying, via the bar, the vegetation from a first location to a second location.

In aspects, carrying the vegetation hanger to transport the vegetation may include transporting the vegetation from a point of harvest to a final drying location.

BRIEF DESCRIPTION OF DRAWINGS

FIG. 1 is a front view of a vegetation hanger in accordance with the present disclosure; and FIG. 2 is a top view of the hanger portion of the hanger of FIG. 1.

DETAILED DESCRIPTION

Embodiments of the presently disclosed vegetation hanger are described in detail with reference to the drawings, in which like reference numerals designate identical or corresponding elements in each of the several views.

Referring to FIG. 1, a vegetation hanger provided in accordance with the present disclosure is shown generally identified by reference numeral 1. The vegetation hanger 1 generally includes a crossbar 300. The crossbar 300 includes a linear portion 310 and an aperture 305. The aperture 305 is disposed centrally along the linear portion 310 and configured to slidably engage a pole or horizontal bar. The linear plate 301 is configured to facilitate the hanging of vegetation thereon. The linear plate 301 includes a first end portion 300a and second end portion 300b, a top edge 300c, and bottom edge 300d. At least a portion of top edge 300c of the linear plate 301 includes at least one ridge, or alternatively as shown, serrated or textured surface including a series or plurality of ridges 312, disposed along the top edge 300c. The series of ridges are configured to prevent vegetation from sliding off the crossbar 300 and provide organization of the vegetation on the series of ridges 312. The linear plate 301 includes one or more lips 315a, 315b disposed on the first and second end portions 300a, 300b, respectively. The lips 315a, 315b are configured to prevent unintended lateral movement of the vegetation off the first and second end portion 300a, 300b. When intended, lateral movement of all the vegetation hung on the crossbar 300 at once may be initiated by a user. The crossbar 300 may be fabricated from a lightweight powdered metal, plastic, composite material, or any other suitable material. The aperture 305 is further configured to receive a zip tie or any suitable fasteners and the linear portion 310 is configured to receive a label disposed along the linear portion 310, in which both zip tie and the label contains harvest information such as, for example, name of harvest, strain, and/or date and time of harvest, in order to facilitate labeling of the harvest.

With additional reference to FIG. 2, the bottom edge 300d is configured to be bent to a predetermined angle such as, for example, 90 degrees, relative to the linear plate 301 to provide additional strength to the linear plate 301 in carrying vegetation on the linear plate 301.

The linear plate 301 may be fabricated at any suitable length, which, as non-limiting examples, may be one of 21", 41", or 61" to accommodate different open spaces, amount of vegetation to be dried, and support of vegetation within a drying system. The vegetation hanger 1 may be configured to be flat providing a minimal thickness to allow for stacking and storage of multiple vegetation hanger(s). Alternatively, the linear plate 301 may be configured to be tapered in two directions from a center point between the first end portion 300a and the second end portion 300b outwardly towards each of the first end portion 300a and the second end portion 300b.

In operation to dry vegetation, the vegetation hanger(s) 1, including the crossbar 300, is slidably engaged with the pole or horizontal bar at the point of harvest. The vegetation may be cut (e.g., to about 24" in length) and hung along the top edge 300c of the crossbar 300. Each piece of harvested vegetation can be placed between adjacent ridges of the series of ridges 312 to prevent individual movement of the vegetation. Once all the vegetation has been placed on the crossbar 300 of vegetation hanger 1, the vegetation hanger 1 may be carried (e.g., by a user) via the pole or horizontal bar from the point of harvest to the final drying location.

While several embodiments of the disclosure have been detailed above and are shown in the drawings, it is not intended that the disclosure be limited thereto, as it is intended that the disclosure be as broad in scope as the art will allow and that the specification be read likewise. Therefore, the above description and accompanying drawings should not be construed as limiting, but merely as exemplifications of particular embodiments. Those skilled in the art will envision other modifications within the scope and spirit of the claims appended hereto.

What is claimed is:

1. A vegetation hanger, comprising:
   a linear plate of a crossbar having a first edge, a second edge, a first end portion, and a second end portion, wherein the first edge is a serrated surface disposed along a topmost surface of the crossbar that is configured to facilitate the stationary hanging and organization of vegetation on the crossbar which includes a plurality of ridges disposed along the first edge upon which is configured for the hanging of vegetation; and
   an aperture disposed centrally along the linear plate and configured to slidably engage with a bar; wherein the linear plate further comprises a protrusion including a first edge, wherein the first edge of the protrusion extends beyond the first edge of the linear plate and wherein the aperture is defined within the protrusion, and wherein the aperture is centrally disposed between the first edge of the protrusion and the second edge of the linear plate.

2. The vegetation hanger according to claim 1, wherein the second edge of the linear plate is bent at a predetermined angle relative to the crossbar.

3. The vegetation hanger according to claim 2, wherein the predetermined angle is 90 degrees.

4. The vegetation hanger according to claim 1, wherein the first and second end portions of the linear plate each includes a lip.

5. The vegetation hanger according to claim 1, wherein the linear plate is tapered from a center point between the first and second end portions outwardly towards the first and second end portion.

6. The vegetation hanger according to claim 1, wherein the vegetation hanger is formed from one or more materials selected from metal, plastic, or composite materials.

7. The vegetation hanger according to claim 1, wherein the protrusion further includes a top edge and a bottom edge.

8. The vegetation hanger according to claim 7, wherein the top edge and the bottom edge of the protrusion are respectively equidistantly located from a top end portion and a bottom end portion of the linear plate.

9. The vegetation hanger according to claim 7, wherein the aperture is centrally disposed between the top edge and the bottom edge of the protrusion.

10. A method of drying vegetation on a vegetation hanger, the method comprising:
    providing the vegetation hanger comprising a linear plate of a crossbar having a first edge, a second edge, a first end portion, and a second end portion, wherein the first edge is a serrated surface disposed along a topmost surface of the crossbar that is configured to facilitate the stationary hanging and organization of the vegetation on the crossbar which includes a plurality of ridges disposed along the first edge upon which is configured for the hanging of vegetation; and
    providing an aperture disposed centrally along the linear plate and configured to slidably engage with a bar; wherein the linear plate further comprises a protrusion including a first edge, wherein the first edge of the protrusion extends beyond the first edge of the linear plate and wherein the aperture is defined within the protrusion, and wherein the aperture is centrally disposed between the first edge of the protrusion and the second edge of the linear plate;
    sliding the vegetation hanger onto a bar;
    hanging the vegetation on the first edge of the crossbar of the vegetation hanger; and
    carrying, via the bar, the vegetation from a first location to a second location.

11. The method according to claim 10, wherein carrying the vegetation from a first location to a second location includes transporting the vegetation hanger from a point of harvest to a final drying location.

12. A vegetation hanger, comprising:
    a linear plate of a crossbar having a first edge, a second edge, a first end portion, and a second end portion, wherein the first edge is a serrated surface disposed along a topmost surface of the crossbar that is configured to facilitate the stationary hanging and organization of vegetation on the crossbar which includes a plurality of ridges disposed along the first edge upon which is configured for the hanging of vegetation; and
    an aperture disposed centrally along the linear plate and configured to slidably engage with a bar,
    wherein the linear plate further comprises a protrusion including a first edge, a top edge, and a bottom edge, wherein:
    the first edge of the protrusion extends beyond the first edge of the linear plate,
    a distance from the top edge of the protrusion to the top end portion of the linear plate is equal to a distance from the bottom edge of the protrusion to the bottom end portion of the linear plate, and the aperture is defined within the protrusion.

13. The vegetation hanger according to claim 12, wherein: the aperture is centrally located between the first edge of the protrusion and the second edge of the linear plate, and the aperture is centrally located between the top edge of the protrusion and the bottom edge of the protrusion.

* * * * *